(12) United States Patent
Dean

(10) Patent No.: US 7,122,114 B2
(45) Date of Patent: Oct. 17, 2006

(54) DESULFURIZATION OF A NAPHTHA GASOLINE STREAM DERIVED FROM A FLUID CATALYTIC CRACKING UNIT

(76) Inventor: Christopher Dean, C/O Saudi Aramco Box 5798, Dhahran 31311 (SA)

( * ) Notice: Subject to any disclaimer, the term of this patent is extended or adjusted under 35 U.S.C. 154(b) by 102 days.

(21) Appl. No.: 10/619,399

(22) Filed: Jul. 14, 2003

(65) Prior Publication Data

US 2005/0011811 A1    Jan. 20, 2005

(51) Int. Cl.
C10G 69/04 (2006.01)
C10G 45/02 (2006.01)

(52) U.S. Cl. .................. 208/97; 208/209; 208/213; 208/210; 208/211; 208/212

(58) Field of Classification Search .............. 208/97, 208/209, 213
See application file for complete search history.

(56) References Cited

U.S. PATENT DOCUMENTS

| | | | |
|---|---|---|---|
| 5,597,476 A | 1/1997 | Hearn et al. | 208/208 R |
| 5,599,441 A | 2/1997 | Collins et al. | |
| 5,779,883 A | 7/1998 | Hearn et al. | |
| 5,837,130 A * | 11/1998 | Crossland | 208/213 |
| 5,863,419 A | 1/1999 | Huff, Jr. et al. | |
| 6,024,865 A | 2/2000 | Alexander et al. | |
| 6,048,451 A | 4/2000 | Huff, Jr. et al. | |
| 6,059,962 A | 5/2000 | Alexander et al. | |
| 6,083,378 A | 7/2000 | Gildert et al. | |
| 6,231,752 B1 | 5/2001 | Putman | 208/213 |

* cited by examiner

*Primary Examiner*—Glenn Caldarola
*Assistant Examiner*—John Douglas
(74) *Attorney, Agent, or Firm*—Abelman, Frayne & Schwab

(57) ABSTRACT

A process for reducing sulfur compounds in naphtha to produce gasoline of ultra-low sulfur content, i.e., 10–30 ppm of sulfur, from a fluidized catalytic cracking reactor effluent stream, withdraws a high sulfur content sidestream of catalytically produced medium and heavy cat naphtha with an endpoint of +430° F. that is fed to a side column where any thiophenic and benzothophenic compounds are catalytically reacted with hydrogen to convert them to hydrogen sulfide. The desulfurized light and mid-cut naphtha is returned to the main fractionation unit and the heavy catalytic naphtha is withdrawn as a product stream from the bottom of the side column.

15 Claims, 1 Drawing Sheet

DESULFURIZATION OF A NAPHTHA GASOLINE STREAM DERIVED FROM A FLUID CATALYTIC CRACKING UNIT

FIELD OF THE INVENTION

The invention relates to the removal of sulfur-containing constituents from naphtha in a feed-stream during processing of the effluent of a fluid catalytic cracking (FCC) unit in a catalytic distillation column.

BACKGROUND OF THE INVENTION

International environmental conventions and trade agreements include provisions requiring national and regional legislation for the establishment of more stringent specifications on motor vehicle fuels to meet stricter air pollution emission standards from automobiles and other motor vehicles. Reduction in sulfur compounds is included in the new fuel specifications.

Engine manufactures are also establishing stricter fuel specifications for their new engines to meet these emission standards. Sulfur in gasoline reduces the effectiveness of catalytic converters and on-board diagnostic equipment in vehicles, thus increasing tailpipe emissions. The reduction of sulfur content in gasoline for internal combustion engines is included as one of the requirements in these more stringent specifications.

The sulfur containing compounds typically found in refinery feedstocks, and which be removed in order to meet impending regulatic thiophene, methylthiophene, tetrahydrothiophene (THT) $C_2$-thiophenes, $C_4$-thiophenes, thiophenol, methylthiophenol, benzothiophene, methylbenzothiophenes and alkylbenzothiophenes. Meeting the 30 ppm specification, which is anticipated for 2005, is projected to cost from 2–5 cents per gallon and will require very substantial capital investments by refiners.

As used herein ultra-low sulfur gasoline means naphtha gasoline products containing no more than 10–30 ppm of sulfur.

As used herein thiophenes and thiophenic compounds refer to all thiophene and alkylthiophenes and alkylthiophenic compounds; and benzothiophenes and benzothiophenic compounds refer to all benzothiophene, alkylbenzothiophenes and alkylbenzothiophenic compounds.

A used herein, the term distillation column reactor means the concurrent reaction and fractionation of a process stream in a column. For the purposes of the present invention, the term catalytic distillation includes reactive distillation and any other process of concurrent reaction and fractional distillation in a column.

The gasoline produced from the effluent of fluid catalytic cracking (FCC) units contributes more that 90% by weight of the sulfur in the gasoline pool. The major portion of the sulfur content in the naphtha stream is attributed to thiophene, thiophenic compounds, benzothiophene, benzothiophenic compounds and other high boiling range +430° F. compounds (alkylbenzothiophenes, benzothiophenes, for example). Unless removed, these heavier compounds can be entrained in the finished gasoline product. A reduction in FCC naphtha sulfur would be a significant step in meeting the current and future specifications for a cleaner burning and more efficient fuel.

Methods for the desulfurization of FCC naphtha are well known in industry. The following four prior art refinery processing options for reducing sulfur content in FCC naphtha are available:

1. Pretreatment of FCC feed—

Pretreatment of the FCC feed, i.e., hydrotreating the feed, can reduce the sulfur in all products produced from the FCC, including the naphtha. However, to reach the low sulfur levels required for the foreseeable "ultra-low sulfur" specifications, post-treatment is still required.

2. Reducing the naphtha distillation endpoint—

Reducing the naphtha endpoint by undercutting the naphtha product can drop the thiophenic and benzothiophenic compounds from the naphtha into the light cycle oil ("LCO"), thereby reducing the sulfur content of the naphtha. This process reduces the volume of desired gasoline produced and does not reduce sulfur in the light fractions.

3. Increase sulfur conversion in the FCC reactor—

Increasing sulfur conversion by the use of catalytic changes, by catalyst, reactor additives or by operating changes can only achieve a modest reduction in the sulfur content of the end products. In the finished FCC gasoline, this so-called "trimming" still requires further post-treatment to significantly reduce the sulfur content.

4. Post-treatment of the FCC naphtha—

Post-treatment of the FCC naphtha utilizing a traditional hydrotreating process is currently the most widely-used method of reducing sulfur to the desired low levels. There are currently numerous commercial and proprietary processes for post-treatment hydrotreating of FCC gasoline. The principal drawback to the use of this process is that post-hydrotreating reduces both the octane and volume of gasoline produced.

As used herein, the term "full-range naphtha" means the petroleum fraction from $C_5$+ to 430° F. final boiling point. As used herein "gasoline" or "FCC gasoline" refers to naphtha that is to be blended with other components to produce a finished gasoline for use as an automotive fuel.

One post-treatment process utilizes prior art catalytic distillation that is a "non-traditional" hydrotreating process. This prior art catalytic distillation process transfers stabilized full range naphtha from the FCC unit to a naphtha splitter and splits the naphtha by distillation into three cuts, i.e., light cat naphtha (LCN), medium cat naphtha (MCN) and heavy cat naphtha (HCN). The LCN is further processed in a hydrotreating unit. The MCN and HCN are subjected to a hydrodesulfurization process. This process utilizes an outside distillation column that splits the naphtha first and then desulfurizes the naphtha.

The processes known to, and disclosed in the prior art for use in reducing sulfur in gasoline require major capital investments. Accordingly, further substantial capital investments will be required if these prior art processes are utilized to produce gasoline that meets the stricter ultra-low sulfur specifications of governmental environmental regulations and of the engine manufacturers.

It is therefore an object of the present invention to provide an improved process for desulfurizing naphtha/gasoline fractions that retains the high octane naphtha components and does not reduce the volume of naphtha fractions recovered from the FCC unit.

It is a further object of the invention to provide a process that minimizes the capital expenditures required to meet governmental regulations and allow refinery-produced finished gasolines having ultra-low sulfur content to be sold for use in the world markets that have established requirements for this type of fuel.

Yet another object of the invention is to provide an improved desulfurization process that is easy to control and that maximizes the end-product gasoline.

SUMMARY OF THE INVENTION

The above objects and other advantages are realized in the process of the present invention which desulfurizes naphtha produced from a fluid catalytic cracking reactor directly by utilizing a high sulfur cat naphtha (HSCN) as a sidestream drawn from the main fractionator column. This HSCN is separated from other hydrocarbons produced in the FCC reactor product stream and contains a medium cat naphtha (MCN) and heavy cat naphtha (HCN) stream that is passed to a side reactive distillation column.

The side column contains catalyst and trays. The side column has a smaller capacity through-put than a naphtha splitter and the operation is easier to control than the apparatus and processes of the prior art because the column does not have to split the boiling point cuts precisely to be effective in the desulfurization process.

In the process of the invention the more difficult to remove sulfur species of thiophenes and benzothiophenes in the tail end of the HCN are specifically targeted for elimination by desulfurization.

Additional benefits resulting from splitting and targeting these particular sulfur-containing species, are that the catalytic distillation process of the invention produces minimal olefin saturation in the catalytic naphtha fraction and minimizes octane loss.

The products of the side column are returned to the main column. Returning all of the side column products to the main column reduces the requirements for auxiliary equipment, such as heat exchangers, pumps and the like. The main column operates normally and all naphtha range and lighter products are recovered and treated in the downstream unsaturated gas plant. The lighter products include side column off gases, excess $H_2$, $H_2S$, and naphtha.

By returning the desulfurized HCN product from the side stripper bottoms to the main column, a heavier stream >430° F. containing alkylthiophenes and benzothiophanic compounds can be treated in this direct process. The >430° F. boiling range material will be recovered as light cycle oil (LCO). This results in improved recovery of naphtha products in terms of both volume and octane values.

The process of the invention withdraws medium cat naphtha (MCN) and heavy cat naphtha (HCN) product streams produced in a fluid catalytic cracking unit directly from the main column fractionator as the high sulfur cat naphtha (HSCN) draw and transfers this material as a feedstream to a side column containing fractionation trays and catalyst in packed beds. The feed to the side column enters near the mid-point of the column on a fractionation tray. The feed tray is chosen through the process design in order for the side column to have two sections, a rectifying and a stripping section typically in fractionation or distillation processes. Required hydrogen for the desulfurization reaction is added to the column below the catalyst beds. The naphtha is split by boiling range into MCN and HCN. Any entrained light cat naphtha (LCN) from the main column leaves the side column as vapor and can optionally be treated in either an additional catalytic distillation packed bed in the main column, or in existing downstream facilities, such as a caustic treating unit or by other known proprietary processes.

The trays and packed beds in the side column function to fractionate the heavier components and selectively desulfurize the sulfur species. The sulfur species in the MCN and LCN occur at different temperature conditions, i.e., based on boiling point, and are easier to convert to $H_2S$ or disulfides due generally to their relatively lower boiling points.

The principal advantage of the process of the invention is that a smaller naphtha volume is intensively treated to remove substantially more of the heavier and more difficult to remove sulfur species of thiophenes and benzothiophenes (such as alkylthiophenes and alkylbenzothiophenic compounds) that boil above +420° F. range. This process improvement substantially eliminates these classes of compounds. Any additional desulfurization of other species of alkylthiophenes and alkylbenzothiophenes is an added benefit. Due to imperfect fractionation in a commercial operation, any heavy alkylbenzothiophenes that are in HCN will also be reduced in this process.

It is a further benefit and advantage of the present invention that an improved split between the light cycle oil (LCO) and HCN will be obtained by returning the MCN and HCN to the main column.

In a second embodiment of the process, material in the +430° boiling range is withdrawn from the main column and fed to the side column to desulfurize more of the heavier range sulfur species, alkylthiophenic and benzothiophenic compounds, in the front end boiling range of the LCO. Returning the side column streams to the main column and having an HCN product take-off several trays up the side column improves the split between the HCN and LCO.

BRIEF DESCRIPTION OF THE DRAWING

The attached drawing shows a simplified schematic process flow sheet of the process of the invention employed with an FCC main column, where the principal improvement in the process of the invention occurs in the side column.

DETAILED DESCRIPTION OF PREFERRED EMBODIMENTS

Figure 1:
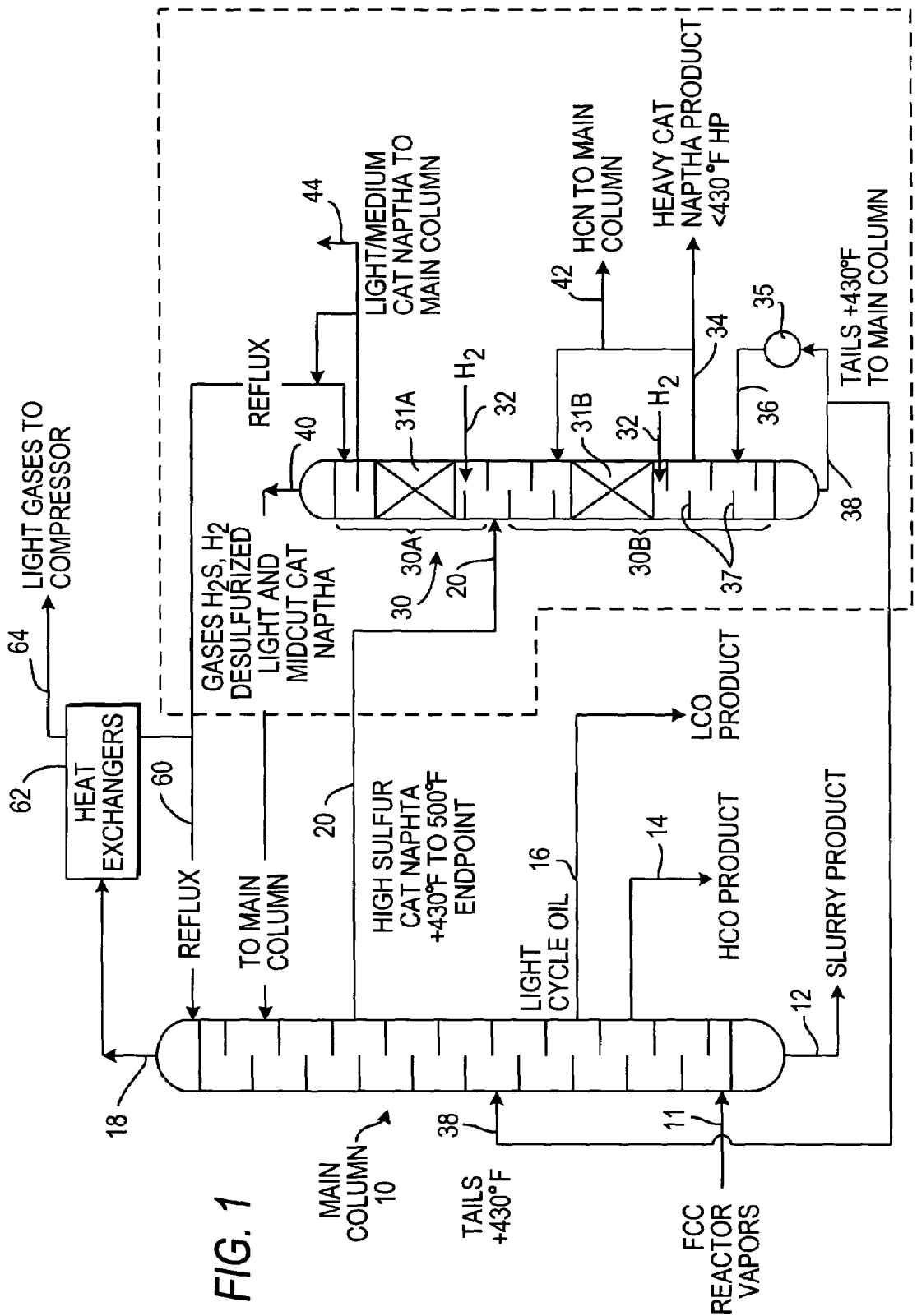

With reference to the drawing, it will be seen that the main fractionation column 10 operates in a conventional manner to separate the FCC reactor effluent stream via distillation into heavy products that are removed as streams: slurry 12, heavy cycle oil (HCO) 14, light cycle oil (LCO) 16, cat naphtha 20 and light gases 18. The naphtha can be split in the main column into a heavy cat naphtha that is withdrawn from the column, with the light cat naphtha being recovered from the column overhead.

In accordance with the process of the invention, the HCN fraction 20 having an end point in the range of +430° F. to 500° F. is withdrawn and fed to the side column 30 where the high sulfur content HCN is split and desulfurized via catalytic reactive distillation. Hydrogen streams 32 are added to the side column 30 as required to maintain the desulfurization reactions. The overhead products 40 from the top of the side column, which include $H_2S$, excess $H_2$, light gases and desulfurized light and mid-cut cat naphtha, are returned to the main column 10 to be recovered in conventional downstream facilities. Optionally, a portion of the desulfurized HCN stream 42 can also be removed as product stream 34 from the side column.

Light/medium cat naphtha stream 44 and heavy cat naphtha stream 42 are also returned to the main column 10.

The +430° F. tails 38 from side column 30 are also returned to the main fractionation column 10 at the appropriate plate, after processing in reboiler loop 35 that removes a lighter stream 36 that is returned to the lower portion of column 30.

As will be understood from the above description, the FCC naphtha direct catalytic distillation desulfurization process of the invention reduces the sulfur content in full range naphtha with minimum octane and volume losses. The process of the invention removes not only the sulfur species in the lighter boiling range naphtha, but also reduces the thiophenes, benzothiophenes and other sulfur species in the heavier naphtha fractions.

The capital costs associated with constructing and operating the side fractionation column to provide gasoline meeting ultra-low sulfur specifications in accordance with the present invention is far more economical than existing equipment and processes for achieving the same result.

The invention provides a process to reduce the sulfur level in cracked naphtha from a fluid catalytic cracking (FCC) unit that produces high-sulfur naphthas. These naphthas are used in producing finished gasoline fuels. The process of the invention reduces sulfur content, while minimizing volume loss and minimizes octane number reduction in the finished gasoline fuel product. Other naphtha feed stocks produced in crude fractionation or other cracking processes can also be utilized in the practice of the invention.

This process has as an additional advantage that it permits better separation of the heavier compounds boiling above +430° F. by fractional distillation in the side column that occurs in the FCC main fractionation column 10. This split between gasoline (430° F.) and heavier (+430° F.) hydrocarbons is better in the side column 30 due to the increased number of fractionation stages between the side naphtha draw and the bottoms. Any +430° F. material entrained with the heavy naphtha will not effect the sulfur content of the heavy naphtha. The heavier fractions +430° F. have been desulfurized from catalytic distillation in the side column 30.

The invention utilizes side fractionation column 30 as a distillation column reactor to treat a portion or all of the naphtha and part of the light cycle oil (LCO) that boils between 430° F. to 500° F. (+430° F.) produced from an FCC unit to remove organic sulfur compounds. The process works by contacting different fractions or boiling ranges, of the naphtha and +430° F. compounds over typical hydrodesulfurization catalysts installed in beds 31A and 31B in the distillation column 30. The catalyst beds 31 are placed in the rectifying and stripping sections of the column. The rectifying section 30A is a portion of the column above the feed inlet and the stripping section 30B is the portion of the column below the feed inlet. Separating the +430° F. naphtha feedstream 20 in the column 30 by distillation into lighter fractions that can be treated in the rectifying section allows the heavier more difficult to remove sulfur compounds to be treated in the stripping section of the column, which process is much more efficient than the prior art processes. One or more of the operating conditions of temperatures, pressure, hydrogen concentration (partial pressure), and catalyst type and volume can be varied to treat a particular hydrocarbon fraction and sulfur species. The selection of the operating conditions and materials is well within the skill of one of ordinary skill in the art.

By using the distillation column reactor 30 with the two reaction zones, 31A and 31B, greater operating flexibility is achieved and better quality naphthas are produced. The operating severity of the distillation column reactor will depend upon the sulfur compounds present in the feed and the degree of desulfurization desired. Mercaptans are much easier to desulfurize than thiophenes and benzothiophenes and their related compounds. As is known from the literature, the desulfurization of thiophenes, benzothiophenes and other cyclic sulfur compounds involves the breaking and saturation of bonds in the rings, and that requires more severe operating conditions. One particular advantage of the process of the invention is that the reactions that occur in the rectifying section 30A are less severe so that less temperature and $H_2$ concentration in stream 32 is required for desulfurization. The more severe conditions in the stripping section 30B can be this utilized for only those species requiring more severe reaction conditions. HCN stream 34 is recovered as product for gasoline fuel blending (not shown).

Thiophenic and benzothiophenic compounds are the targeted heavy sulfur compounds to be reduced. In the process of the invention, finished heavy gasoline product 34 is drawn from the distillation column reactor 30 and a heavier product 38 containing converted benzothiophenic compounds recovered as tails is returned to the primary FCC unit distillation column, or main column 10.

EXAMPLE I

Feed:
Defined as High Sulfur Cat Naphtha from an FCC unit main column.
Feedstock is naphtha in the boiling range, i.e., 95° F. $C_5$ to 430° F., and heavier gasoline in the range of about 300° F. to 500° F.
Temperature of Side Column:
From about 100° F. to 600° F. overall;
100° F. to 400° F. Typical operating temperatures for the top bed 31A
300° F. to 500° F. Typical operating temperatures for the bottom bed 31B.
Pressure:
From about <25 to 200 psig.
$H_2$ Partial Pressure:
Between 0.1 and 60 psi.

A suitable catalyst family widely known and used in industry that is suitable for this hydrodesulfurization process is a combination of Group VI and Group VII elements in the Periodic Table of elements. Typically, the cobalt and molybdenum are supported on a substrate base of alumina to form the catalysts. Suitable catalyst types include cobalt-molybdenum, nickel-molybdenum and nickel-tungsten.

The initial fractionation column, or main column 10, separates the reactor effluent 11 produced in a fluid catalytic cracking unit (not shown) into gases and different boiling range liquid products. Typical boiling ranges are as follows for cat naphtha: $C_5$ to 430° F.; light cycle oil (LCO): 430° F. to 650° F.; and for heavy cycle oil: (HCO)/slurry: +650° F.

The side stream distillation column reactor 30 contains at least two beds 31A, 31B provided with hydrotreating type catalyst in a distillation type structure.

The feed to column 30 is withdrawn from column 10 as a high sulfur cat naphtha (HSCN) that contains naphtha and that portion of the light cycle oil (LCO) that boils between 430° F. to 500° F. (+430° F.). The naphtha can be full range, but in a preferred embodiment the lighter cat naphtha (LCN) fraction ($C_5$ up to 250° F.) is retained in the main column 10 to be recovered and treated to remove sulfur compounds by any of the prior art processes that are well known in the industry.

The HSCN feed contains hydrocarbons that boil in the $C_5$ to 430° F. boiling range, olefins, diolefins and all types of sulfur compounds that boil in the naphtha range. These include mercaptans, sulfides, di-sulfides and other sulfur compounds and the heavier thiophene and benzothiophene compounds. Other thiophenic and benzothiophenic compounds are in the +430° F. (LCO) fraction that is also in the HSCN feed.

The feed 20 is delivered to column 30 where it is split via distillation into lighter and heavier boiling fractions. Both fractions with added H$_2$ from line 32 contact catalyst in beds 31A, 31B of distillation-type structures for chemical reaction to occur that remove impurities such as sulfur. These sulfur compounds are converted to H$_2$S that is removed as a gas (vapor) 40 from the top of column 30 that is returned to column 10 with the light hydrocarbon compounds.

The lighter fractions in the feed are vaporized and travel up column 30 and come in contact with liquid and separation occurs as in the conventional distillation process. The vapor combines with H$_2$ that is fed to the column via 32 and passes over catalyst beds where liquid contact occurs. Catalytic reactions occur that result in the organic sulfur compounds being converted to H$_2$S; the remaining hydrocarbons 44 are relatively sulfur free. The gases and H$_2$S that are produced in the reactions and any excess H$_2$ and light hydrocarbons in the vapor phase leave column 30 in a second stream 40 and are returned to column 10. The gases and lighter hydrocarbons are recovered as in the conventional FCC process scheme.

The overhead fraction in the second stream can include some C$_5$+ and/or light cat naphtha (LCN), depending on the initial draw temperature for the first HSCN stream and the operating conditions in Column 30. LCN can be condensed and drawn from column 30 in the top portion of the column as a third stream. By varying the HSCN draw temperatures in column 10 and the operating conditions in the top part of column 30, the reaction severity can be controlled. The sulfur species in this light fraction are the easiest to remove and the operating conditions are not as severe as those required in the bottom part of the column. Due to the relatively mild operating conditions, the degree of olefin saturation is reduced, thereby minimizing the loss of octane. The diolefins in this light fraction will also be removed in the desulfurization process.

The heavier boiling fractions containing sulfur compounds, primarily the thiophenic and benzothiophenic compounds, and the +430° F. (LCO) fraction, pass over catalyst bed 31B in the bottom section of column 30 where it combines with H$_2$ stream 32 and the desulfurization reactions proceed. The operating conditions and the catalyst requirements to desulfurize these compounds are more severe than for the upper stages of sulfur-containing hydrocarbons. The heavy cat naphtha (HCN) (<430° F.) is recovered from the column as a fourth side stream draw 34 that is sent for gasoline blending. The heavier fractions (+430° F.), or "tails", are recovered as tower bottoms in a fifth stream 38. By utilizing fractionation trays 37 below the reactor beds and removing the tails 38 in the bottom of column 30, better separation will occur with less heavy tails entrained in the HCN product stream 34. Any tails that are entrained will contain a very small proportion of sulfur compounds due to their treatment in the catalyst beds.

For distillation in column 30 to occur, a portion of the bottoms 38 is vaporized in a reboiler 35 and part of the naphtha in the third and fourth streams are returned to the column 10 as liquid reflux 60. By maintaining operating conditions in accordance with methods that are well known in the art, additional light naphtha liquid reflux can be drawn from column 10 as a sixth stream via heat exchanger 62.

The light cat naphtha 40 and the "tails" 38 are returned to column 10 for recovery. The tails are recovered as LCO and the LCN is recovered as naphtha in the column 10 overhead. This naphtha has to be further processed downstream to remove additional H$_2$S and lighter ends. A portion of the HCN recovered from column 30 can be optionally returned to column 10 as reflux, or it can be sent for blending in finished gasoline.

From the above description, it will be apparent to those of ordinary skill in the art that various modification and changes can be made to the process of the invention without departing from the spirit of the invention, and that its scope is to be determined with reference to the claims that follow.

I claim:

1. A process for reducing the sulfur content of naphtha in the effluent from a fluid catalytic cracking reactor during treatment in a catalytic distillation fractionation column, the process comprising:
  a. drawing from the fractionation column a stream of high-sulfur hydrocarbons, full-range catalytic cracked naphtha and light cycle oil fraction boiling in the range C. sub. 5 to 500° F.
  b. introducing the high-sulfur hydrocarbon and naphtha stream into a reactive distillation side column for hydrodesulfurizing;
  c. introducing hydrogen into the side column;
  d. operating the side column to desulfurize the high-sulfur hydrocarbons and provide a low-sulfur content naphtha;
  e. separating and withdrawing a low-sulfur content naphtha fraction C. sub. 5 to 430. degree. F. boiling range from the side column;
  f. returning the low-sulfur content naphtha to the fractionation column; and
  g. recovering the low-sulfur content naphtha from an overhead stream withdrawn from the fractionation column.

2. The process of claim 1, wherein the recovered low-sulfur content naphtha contains 200 ppm or less of sulfur.

3. The process of claim 1, wherein the recovered low sulfur content naphtha contains not more than 30 ppm of sulfur.

4. The process of claim 1, wherein the recovered low sulfur content naphtha contains sulfur in the range from 30 ppm to 200 ppm.

5. The process of claim 1, wherein the high-sulfur hydrocarbons include compounds selected from the group consisting of mercaptans, sulfides, disulfides, thiophenes, benzothiophenes, and thiophenic and benzothiophenic compounds.

6. The process of claim 1 which further includes withdrawing a +430° F. heavy catalytic cracked naphtha stream from the bottom of the side column and returning it to the fractionation column.

7. The process of claim 1, wherein the low-sulfur content naphtha is returned to the fractionation column in the form of a first stream comprising light and medium catalytic cracked naphtha and a second stream comprising heavy catalytic cracked naphtha.

8. The process of claim 7 which further includes withdrawing a portion of the second stream as a separate heavy catalytic naphtha product stream.

9. The process of claim 7 which further includes returning a vapor portion of the second heavy catalytic cracked naphtha stream to the side column above the take-off of the second stream.

10. The process of claim 1 which further includes separating and removing from the fractionation column a heavy cycle oil product stream and a light cycle oil product stream.

11. The process of claim 10, wherein the side column bottom stream is returned above the take-off position of the light cycle oil stream.

12. The process of claim 1, wherein the side column includes plates and trays and said trays contain a hydrodesulfurization catalyst.

13. The process of claim 1, wherein the hydrogen is introduced into the side column in at least two locations.

14. The process of claim 13, wherein at least one hydrogen stream is introduced below and one hydrogen stream is introduced above the position of the introduction of the high-sulfur catalytic naphtha stream.

15. The process of claim 7, wherein at least a portion of the overheads from the side column that are returned to the fractionation column comprise low-sulfur light and mid-cut naphtha.

* * * * *